United States Patent [19]

Ueda et al.

[11] Patent Number: 4,692,197
[45] Date of Patent: Sep. 8, 1987

[54] METHOD FOR MANUFACTURING CORRUGATED TUBES

[75] Inventors: Koutarou Ueda, Fuji; Noboru Hasegawa, Fujisawa; Akio Machihara, Yokohama; Masaharu Kusaka, Yokosuka; Kohei Orii, Miura; Yoshiro Noguchi, Odawara, all of Japan

[73] Assignee: Toyo Chemical Co., Ltd., Kamakura, Japan

[21] Appl. No.: 800,002

[22] Filed: Nov. 20, 1985

Related U.S. Application Data

[62] Division of Ser. No. 615,977, May 31, 1984, Pat. No. 4,575,400.

[30] Foreign Application Priority Data

| Jun. 8, 1983 [JP] | Japan | 58-102465 |
| Mar. 22, 1984 [JP] | Japan | 59-53582 |
| Mar. 23, 1984 [JP] | Japan | 59-54483 |

[51] Int. Cl.⁴ .......................................... B65H 81/00
[52] U.S. Cl. ................................................... 156/189
[58] Field of Search ............... 156/184, 189, 195, 294, 156/244.12, 244.15, 428, 429, 498, 191; 264/103, 173, 281, 339, 505, 508, 210.3; 425/369, 370, 380, 326.1; 138/145; 427/231

[56] References Cited

U.S. PATENT DOCUMENTS

| 3,126,306 | 3/1964 | Sherman | 156/392 |
| 3,690,993 | 9/1972 | Hawerkamp | 156/429 |
| 4,292,113 | 9/1981 | Hirata | 156/428 |
| 4,368,088 | 1/1983 | Asakura et al. | 156/195 |

Primary Examiner—Jay H. Woo
Assistant Examiner—Timothy W. Heitbrink
Attorney, Agent, or Firm—Jordan and Hamburg

[57] ABSTRACT

A method for forming a corrugated tube having a smooth inner wall surface and a corrugated outer wall are provided. A first strip of resin material is wrapped around first portions of rollers arranged in a circular array and is helically wrapped around the first portions of the rollers each having equally spaced ridges therearound to form the corrugated outer wall. A second strip of resin material is fed from the interior of second portions of rollers arranged in a circular array onto the inner surface of the outer wall being manufactured and bonded thereto. The second strip bonded to the outer all is wrapped around the second portions of the rollers each having a smooth surface to form the smooth inner wall.

4 Claims, 10 Drawing Figures

METHOD FOR MANUFACTURING CORRUGATED TUBES

This is a division of application Ser. No. 615,977, filed May 31, 1984, now U.S. Pat. No. 4,575,400.

BACKGROUND OF THE INVENTION

This invention relates to a method and apparatus for producing a corrugated tube made of synthetic resin, and more particularly to a method and apparatus for manufacturing a corrugated tube having a smooth inner wall surface along the length of the tube and a corrugated outer wall in longitudinal cross-section to provide enhanced flexibility and high pressure resistance.

Various types of flexible hose or tubes made of synthetic resin and method and apparatus for manufacturing the same have been heretofore proposed and some of them are currently in use.

For example, U.S. Pat. No. 4,292,113 discloses a method and apparatus for continuously forming a corrugated tube from a strip of synthetic resin in a softened state by the use of a plurality of rotating rollers arranged in a circular array such that the rollers define an imaginary cylinder about its central axis with the axes of the rollers being parallel to each other but angled relative to the central axis of the imaginary cylinder whereby as the rollers rotate the strip is helically wrapped around and advanced axially along the imaginary cylinder with portions of adjacent turns of the strip overlapping and joined together to form a continuous tube; wherein each of the rollers is provided with a plurality of axially spaced annular ridges therearound, the ridges of the respective rollers being so arranged that the associated successive ridges of each adjacent rollers are aligned in a spiral path around the imaginary cylinder.

However, by the aforementioned method it is not possible to manufacture a corrugated tube having a smooth inner wall surface. Thus, this method has a great disadvantage in that materials such as sands, stones or impurities contained in a fluid passing through the tube will pile up in the inner spiral grooves or corrugations inevitably formed in the interior of the corrugated tube, thus blocking the tube after long use.

Alternatively, U.S. Pat. No. 4,368,088 discloses a method for manufacturing a corrugated tube having a smooth inner wall surface along the length of the tube and a corrugated outer wall in logitudinal cross-section. Specifically, the method comprises the steps of arranging in a circular array a plurality of rollers each rotating at the same speed such that an imaginary cylinder is defined about its central axis by the rollers, the longitudinal axes of the rollers being parallel to each other but offset with respect to the central axis; continuously feeding a flat non-reinforced strip of synthetic resin material in a softened state generally perpendicuarly to the length of the rollers in such a manner that the strip is helically wrapped around and advanced axially along the imaginary cylinder with portions of adjacent turns of the strip overlapping one another and welded together; continuously feeding a flexible core member and embedding it between the overlapping portions of adjacent turns of the strip to raise the upper one of the overlapping portions so as to define spiral raised convolutions around the tube; and pressing a pressure roller against the overlapping portions of the strip having the flexible core member embedded therein; whereby a corrugated tube is formed having spiral convolutions defined by the embedded flexible core member around the outer periphery of the tube along the length thereof and a smooth inner wall surface. However, the flexible tube produced according to this type of prior art method requires a reinforcing core member which is embedded in the overlapping portions of the strip as it is spirally wrapped around, in order to impart required flexibility and resistance to exterior pressure.

Thus, the tube having a core member embedded in its wall not only requires complicated manufacturing procedures but also has a disadvantage in that a uniform resistance to exterior pressure is not necessarily ensured throughout the tube wall due to differentials in strength between the core member-embedded portions and the remaining portions.

OBJECTS AND SUMMARY OF THE INVENTION

Accordingly, an object of the present invention is to overcome the foregoing drawbacks to the prior art.

A specific object of the invention is to provide a method and a relatively compact and simple apparatus for continuously producing a corrugated tube having a corrugated outer wall in longitudinal cross-section and a smooth inner wall surface along the length of the tube, thus ensuring smooth passage of fluid passing through the tube without fear for blockade of the tube.

Another object of the invention is to provide a method and apparatus for manufacturing a tube having a smooth inner wall surface and a corrugated outer wall in longitudinal cross-section which has a uniform wall thickness throughout the tube and sufficient flexibility and pressure resistance.

Still another object of the invention is to provide a method and apparatus for manufacturing a corrugated tube having a uniform resistance to pressure throughout the tube.

A further object of the invention is to provide a method and apparatus for manufacturing a corrugated tube provided with an adequate pressure resistance without the need for using any reinforcement means such as a reinforcing core member.

The above and other objects of the invention will become apparent from the following description when taken in conjunction with the accompanying drawings.

According to the present invention, there is provided a method of manufacturing a corrugated tube having a smooth inner wall surface along the length of the tube and axially extending spiral convolutions to define a corrugated outer wall in longitudinal cross-section comprising the steps of;

arranging in a circular array a plurality of rollers each rotating at the same speed such that an imaginary cylinder is defined about its central axis by the rollers, the longitudinal axes of the rollers being parallel to each other but offset with respect to the central axis of the imaginary cylinder;

continuously feeding a first strip of synthetic resin material in a softened state generally perpendicularly to the length of the rollers in such a manner that the strip is helically wrapped around and advanced axially along the imaginary cylinder defined by the rollers with portions of adjacent turns of the strip overlapping one another and being welded together to form a continuous tube, each of the rollers having a first portion with axially spaced annular ridges around the outer periphery thereof and a second portion with a smooth surface, the ridges of the respective rollers being so arranged that the associated successive ridges of each adjacent roller are aligned in a spiral path around the imaginary cylinder, the first strip of synthetic resin material being fed onto the imaginary cylinder while being pressed onto at least one of the first portions of the rollers so that the convolutions are formed on the strip by the ridges, while one turn of the first strip being wrapped around imaginary cylinder is overlapped by the next succeeding turn of the strip, whereby to form the corrugated outer wall; and continuously feeding a second strip of synthetic resin material from the inside of the imaginary cylinder, the second strip of synthetic resin material in a softened state being fed onto the inner surface of the outer wall and bonded thereto and guided by the second portion of each roller so that the smooth inner wall is formed on the inner surface of the outer wall, while one turn of the second strip being wrapped around the second portions of the rollers is overlapped by the next succeeding turn of the second strip, whereby to form a smooth inner wall surface.

According to the invention, there is also provided apparatus for manufacturing a corrugated tube having a smooth inner wall surface along the length of the tube and axially extending spiral convolutions to form a corrugated outer wall in longitudinal cross-section comprising:

a roller assembly composed of a plurality of rollers arranged in a circular array so as to define an imaginary cylinder about its central axis with the longitudinal axes of the rollers offset with respect to the central axis of the imaginary cylinder while the rollers are maintained in parallel to each other;

first feeding means for continuously feeding a first strip of synthetic resin material in a softened state transversely onto the periphery of the roller assembly;

drive means for rotating each of the rollers at the same speed;

each of the rollers having a first portion with a plurality of axially equally spaced annular ridges therearound and a second portion with a smooth surface, the ridges of the respective rollers being arranged such that the associated ridges of each adjacent roller are successively aligned with each other along a spiral path;

pressure roller means having annular ridges therearound adapted to mate with recesses defined by each adjacent ridge of at least one of the rollers, whereby said first strip is spirally wrapped around the first portions of the rollers while being axially advanced, and the first strip is formed with corrugations along the ridges as it is wrapped around, to thereby form a corrugated outer wall; and second feeding means disposed in the interior of the roller assembly for continuously feeding a second strip of synthetic resin material in a softened state, from the inside of the outer wall being manufactured, onto the inner surface of the outer wall so that the second strip is bonded to the inner surface of the outer wall and guided by the second portions of the rollers, whereby the second strip is spirally wrapped around the second portions of the rollers while being axially advanced together with the outer wall, to thereby form a smooth inner wall surface.

PREFERRED EMBODIMENTS OF THE INVENTION

Figure 1:
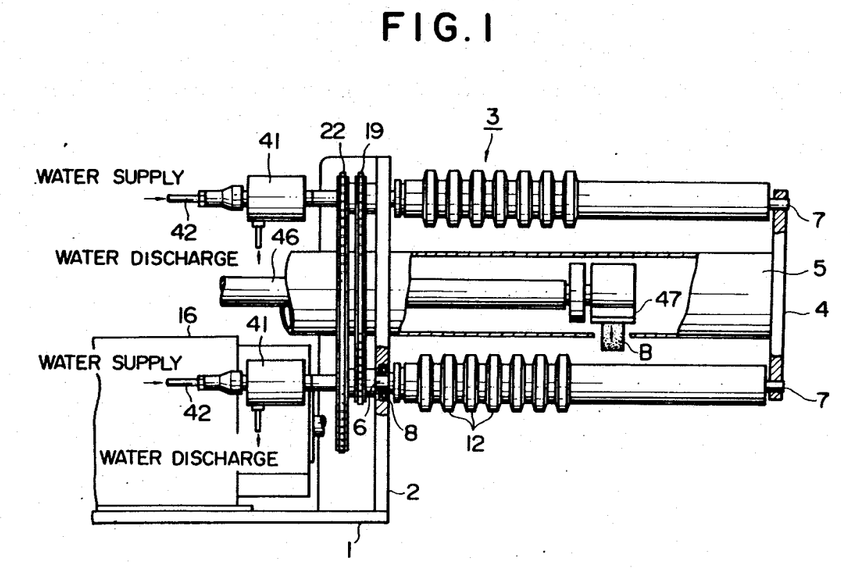
FIG. 1 is a side elevation of an embodiment of an apparatus according to the invention for manufacturing a corrugated tube illustrating only two rollers for the benefit of clarity.
Figure 2:
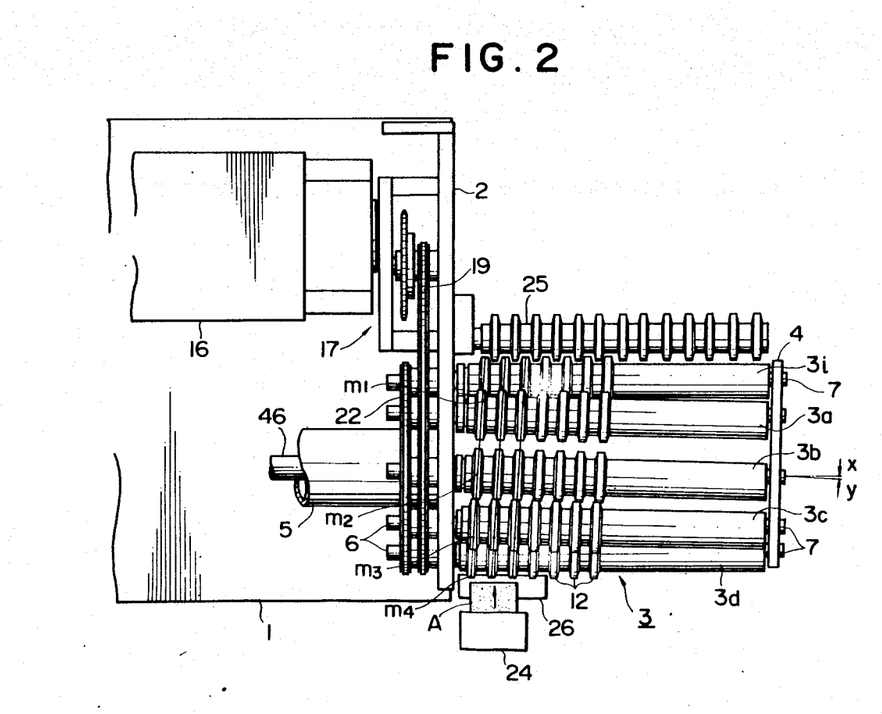
FIG. 2 is a top plan view of the apparatus shown in FIG. 1 with the rotary joints associated with the respective rollers being removed from the drawing for the purpose of illustration.

Referring to FIGS. 1 through 7, an apparatus according to the invention for manufacturing a corrugated tube includes a base 1, an upright support frame 2 mounted on the base 1 and a roller assembly 3. A strip (A) of synthetic resin material is extruded from an outer extruder 24 as shown in FIG. 2 and fed onto and wrapped around the roller assembly 3 to be formed into an outer wall of a corrugated tube. The outer wall is formed with corrugations in cross-section by the roller assembly 3.

The roller assembly 3 comprises a circular array of nine rollers 3a, 3b, 3c . . . 3i extending between and rotatably carried by the support frame 2 and the opposed support disc 4 in the embodiment shown in FIGS. 1-7.

Figure 4A:
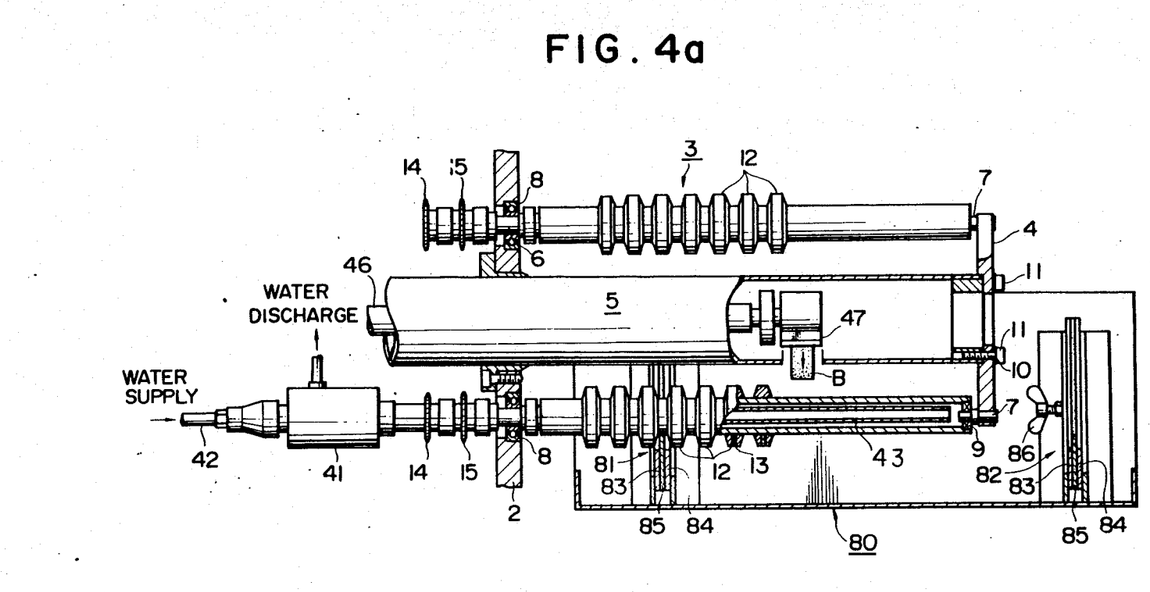
FIG. 4a is an enlarged, partly broken away view showing the details of the rollers of the apparatus shown in FIGS. 1 and 2 wherein only two of the rollers are shown for simplicity and the cooling means associated with only one of the rollers is illustrated.
Figure 4B:
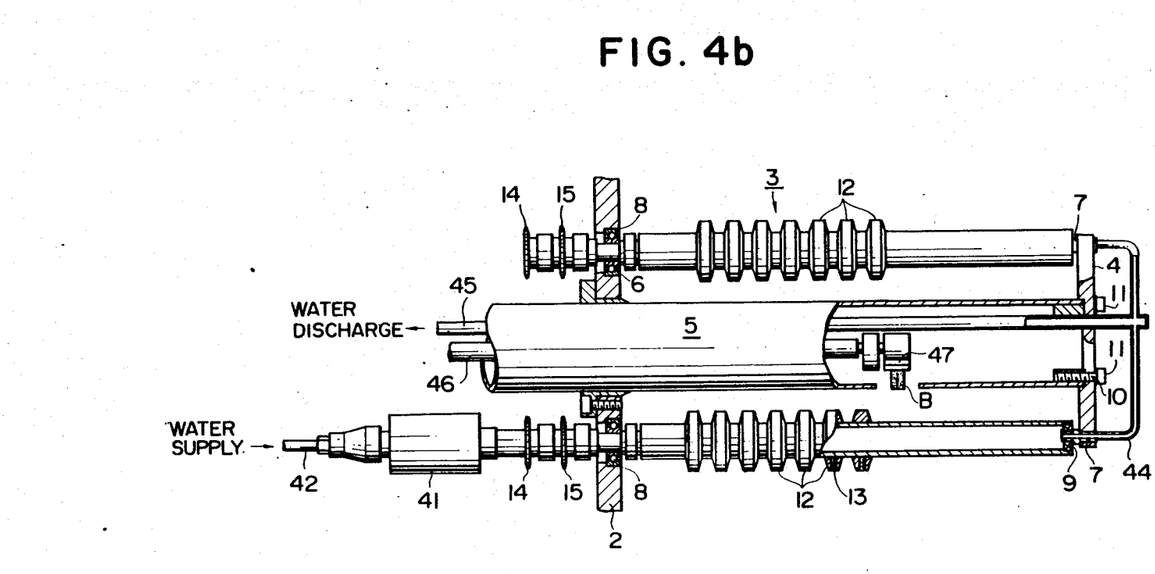
FIG. 4b is an enlarged, partly broken away view similar to FIG. 4a in which an alternate form of cooling means different from that of FIGS. 1 to 3 is shown but the cooling and regulating means is not shown for simplicity.
Figure 5:
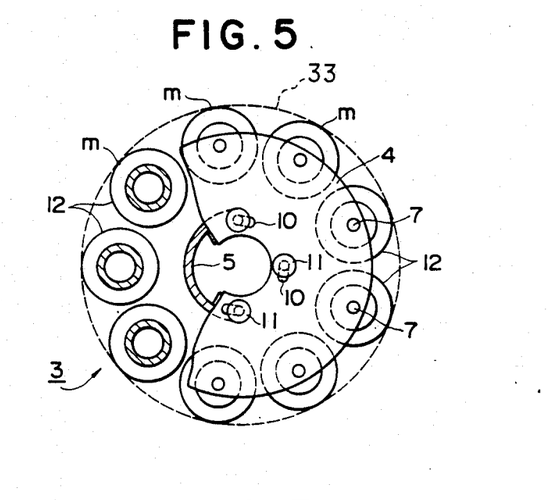
FIG. 5 is a front view of the apparatus shown in FIGS. 1 to 3 illustrating the arrangement of the rollers in a schematic form for the benefit of clarity.

A hollow base shaft 5 extending through the support frame 2 is disposed centrally within the array of the rollers. The support disc 4 is secured to the base shaft 5 adjacent its outer end. The rollers 3a, 3b, 3c . . . 3i extend between the opposed surfaces of the support frame 2 and support disc 4 and are equally spaced apart and arranged parallel to each other around an imaginary cylinder about the base shaft 5. Each of the rollers is rotatably mounted at its opposite ends by means of stud shafts 6 and 7 which are received in bearings 8 and 9, respectively (FIGS. 4a and 4b). As shown in FIGS. 4a, 4b and 5, the support disc 4 secured to the outer end of the base shaft 5 is formed with a plurality of elongated slots 10 extending therethrough and arranged in a circular array confronting with the end of the base shaft 5. Each of the slots 10 is elongated for a predetermined length in the circumferential direction of the base shaft 5. The support disc 4 is secured to the end of the base shaft 5 by bolts 11 passed through the slots 10 in the disc 4 and threaded into the shaft end. With this arrangement, the disc 4 may be rotated about the axis of the base shaft to the limit determined by the elongated slots 10 whereby the longitudinal axes of the rollers 3a, 3b, . . . 3i may be angled or offset with respect to the central longitudinal axis of the base shaft while the rollers are maintained in parallel with each other. FIG. 2 illustrates the rollers 3a, 3b, . . . 3i arranged with their axes offset with respect to the base shaft 5. Taking the roller 3b for example, it will be noted that the axis y of the roller 3b is angled with respect to a line x parallel to the axis of the base shaft 5. The bearings 8, 9 for the rollers are adapted to accommodate such angular arrangement of the rollers. Such bearing per se are known and need not be described herein in detail.

As best seen in FIGS. 4a and 4b, the rollers 3a, 3b, . . . 3i are each provided with a plurality of annular ridges 12 surrounding their peripheries and spaced apart with a predetermined pitch along about half the length of the rollers, thus presenting the configuration similar to a grooved roller. In the embodiment illustrated, the ridges 12 are formed by a plurality of spaced apart rings fitted around a smooth surfaced cylindrical roller mandrel. The ridges or rings 12 have a trapezoidal cross section and are inserted over the roller mandrel successively from one end thereof and secured to the mandrel with a predetermined pitch by means of set screws 13 passed radially through the rings with the top ends of the screws recessed from the outer peripheral surfaces of the rings. The rings 12 are arranged with the same spacings on all the rollers but the pitch of the rings on each roller may be varied by the use of set screws 13. As shown in FIGS. 1, 2, 4a and 4b, the rollers 3a, 3b, . . . 3i each do not have annular ridges 12 therearound along the remaining half of the length of the rollers, thus presenting the configuration of a smooth surface. Within the base shaft 5, a conduit 46 for passing molten synthetic resin material therethrough and an inner extruder 47 connected to the conduit 46 are disposed. A strip (B) of synthetic resin material is extruded from the inner extruder 47 and fed onto the smooth surface portion of each roller 3a, 3b, . . . 3i to be formed into a smooth inner wall surface of the corrugated tube, as described in detail hereinafter.

Figure 3:
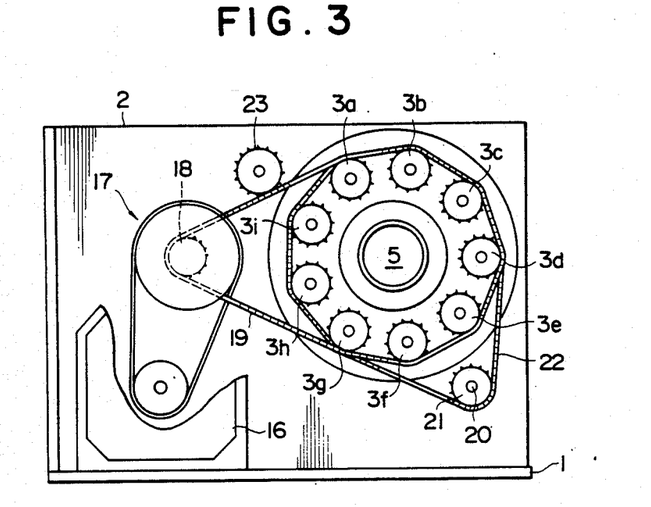
FIG. 3 is a rear view of the apparatus shown in FIGS. 1 and 2.

As shown in FIGS. 4a and 4b, sprockets 14 and 15 are mounted on the stud shafts 6 of the rollers 3a, 3b, . . . 3i extending through the support frame 2. The sprockets 14 are secured to the shafts 6 of the seven rollers 3a to 3g while the sprockets 15 are secured to the shafts 6 of the seven rollers 3g to 3d as seen from FIG. 3. As also shown in FIG. 3 an endless chain 19 is passed around the sprockets 14 and a sprocket 18 which is secured to the output shaft of a reducer 17 which is in turn connected to a motor 16. A second endless chain 22 is trained around the sprockets 15 and an idler sprocket 21 which is loosely mounted to a shaft 20 staked to the support frame 2. With this arrangement the operation of the motor 16 causes rotation of the sprocket 18 via the reducer 17 to thereby move the chain 19 which in turn rotates the sprocket 14 and their associated rollers 3a to 3g. The rotation of the rollers 3a to 3g causes rotation of the sprockets 15 secured to the shafts 6 of the rollers 3a to 3d and 3g and movement of the endless chain 22 engaged with those sprockets 15. The rotation of the chain 22 in turn rotates the remaining rollers 3h and 3i. Thus, the motor 16 is operable to rotate all of the nine rollers constituting the roller assembly 3 by means of the chains 19, 22 in the direction of rotation of the chain 19. The drive mechanism further includes a tension adjusting sprocket 23 for adjusting the tension of the chain 19.

As indicated hereinbefore, when the rollers 3a, 3b, . . . 3i are angled with respect to the base shaft 5 by turning the disc 4, an imaginary line connecting successive adjacent contact points m1, m2, m3 . . . (FIGS. 2 and 5) between the ridges or rings 12 on the adjacent rollers and the periphery of the imaginary cylinder 33 defined by the rotating roller assembly 3 describes a spiral axially advancing movement around the imaginary cylinder. Accordingly, considering the roller assembly as a whole, the ridges 12 may be considered as if they were spirally extending around the periphery of the roller assembly. As stated hereinbefore, the pitch of such "spiral" ridges may be varied by changing the spacing between the rings 12 on the rollers 3 whereby the corrugated outer wall configuration to be formed from the strip (A) may be varied.

Referring to FIG. 2, the outer extruder 24 is mounted at one side of the roller assembly 3 adjacent the support frame 2 to feed a strip (A) of synthetic resin transversely onto the roller assembly 3. Positioned parallel to the roller assembly 3 downstream of the extruder is a pressure roller 25 having complementary ridges for meshing engagement with the ridges 12 of the roller assembly 3 and adapted to press the softened strip (A) as it is extruded through the extruder 24 against the periphery of the roller assembly. Contrary to the rollers 3a, 3b, . . . 3i, the pressure roller 25 is provided with ridges along the entire length of the roller 25. As the strip (A) in the form of tape or web is extruded through the extruder 24, it is guided by a guide roller 26 onto the periphery of the roller assembly 3 whereupon due to the angular disposition of the rollers 3a, 3b, . . . 3i relative to the base shaft 5 as described before the synthetic resin strip is axially advanced in a spiral path along the ridges 12 and wrapped around the periphery of the roller assembly as the rollers 3 rotate. More specifically, in the illustrated embodiment the strip (A) is first fed onto the roller 3c and then wrapped around the rotating roller assembly as it is passed successively along the rollers 3b, 3a, 3i, 3h . . . The synthetic resin strip (A) is wrapped around in its flat state while it is passed around the first three rollers 3a, 3b and 3c until it reaches the roller 3i. As the strip passes around the roller 3i it is passed against said roller by the opposed pressure roller 25 to be formed in conformity with the corrugations on the rollers and continues to be spirally wrapped around while it remains in its corrugated configuration.

Figure 6:
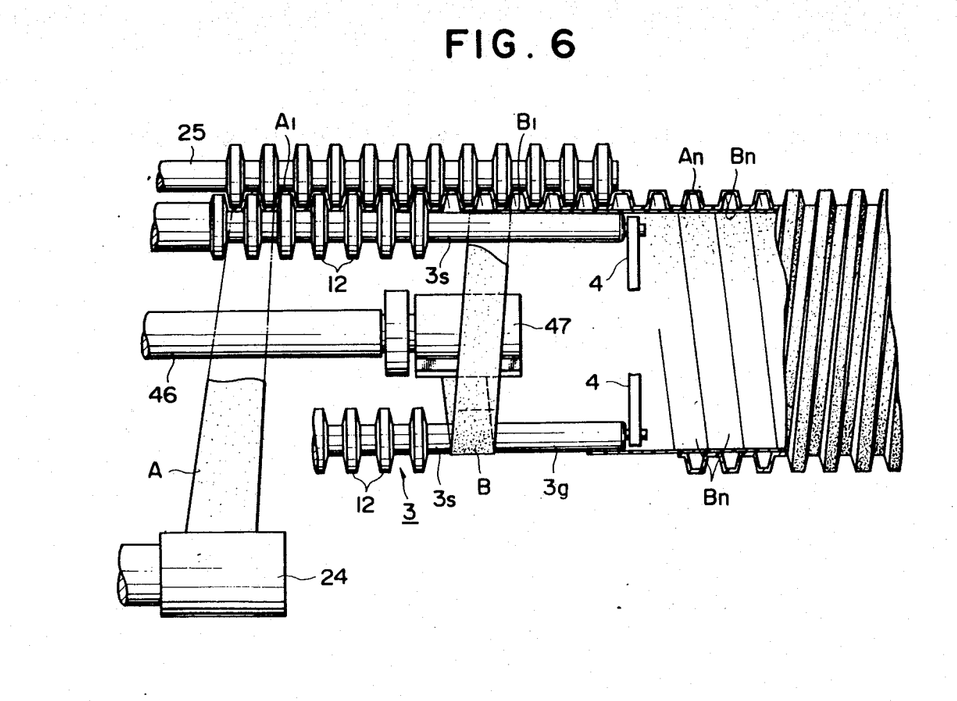
FIG. 6 is a perspective view showing schematically a corrugated tube being manufactured.
Figure 7:
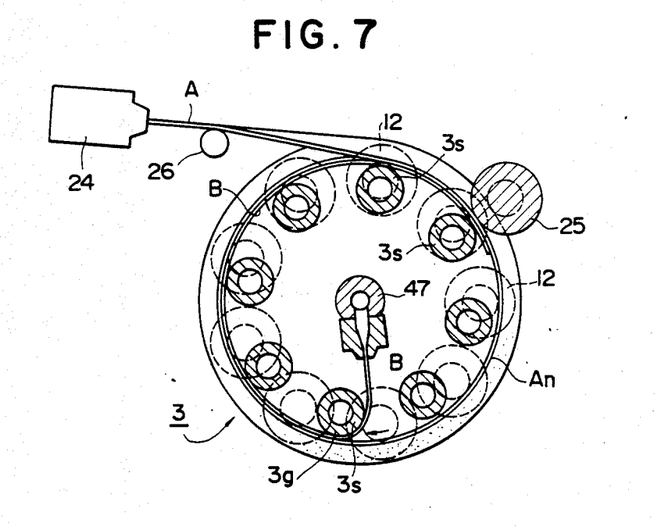
FIG. 7 is a front view of the apparatus shown in FIGS. 1 to 3 schematically illustrating the formation of an inner wall.

As best seen in FIG. 6, the synthetic resin strip (A) from the outer extruder 24 is thus spirally wound around to form an outer wall (A1) as it completes one turn around the roller assembly 3 and then the succeeding turn of the strip overlaps partially the first spiral turn. The flat strip (A) is thus continuously wrapped around and fed forward of the roller assembly 3 as a corrugated outer wall (An) having spiral corrugations therearound. While the outer wall (An) is formed and spirally advanced forward over the smooth surface portions 3s of the rollers 3, a flat synthetic resin strip (B) from the inner extruder 47 is fed from the inside of the roller assembly 3 downwardly by gravity and abuts against the inside surface of the outer wall (An). Then, as shown in FIG. 7, the strip (B) is wound toward the rotating direction shown by an arrow and onto the smooth surface 3s of the lowermost roller 3g. Since the strip (B) is in a softened state, it is bonded to the inner surface of the outer wall (An) and spirally wound around the smooth surface portions 3s of the rollers 3 to form a smooth inner wall surface ($B_1$) after the strip (B) completes one turn around the roller assembly 3. The strip (B) is continuously fed and wrapped while partially overlapping with the succeeding turn of the strip (B) to form the smooth inner wall surface (Bn) bonded to the inner surface of the outer wall (An). In this manner, a corrugated tube having a smooth inner wall surface along the length of the tube and a corrugated outer wall in longitudinal cross-section is continuously manufactured as shown in FIG. 6.

Figure 8:
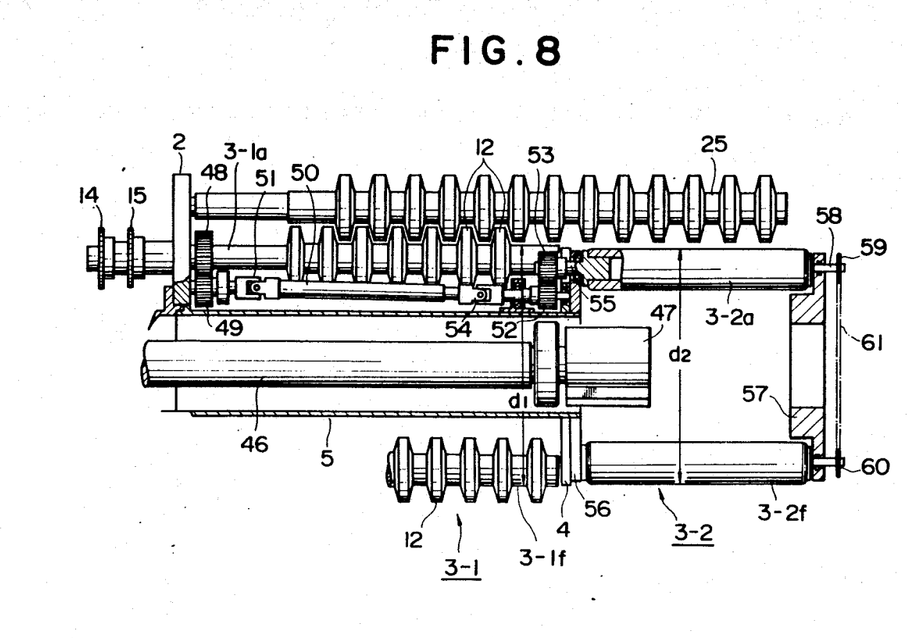
FIG. 8 is an enlarged, partly broken away view showing another example of roller assemblies.

In FIG. 8, there is shown another embodiment of the present invention. In this embodiment, the roller assembly is divided into two parts 3-1 and 3-2. The roller assembly 3-1 is constituted by nine rollers 3-1a, 3-1b, . . . 3-1i (In FIG. 8 only roller 3-1a and 3-1f are shown for simplicity.) each having annular ridges or rings 12 similarly to the embodiment shown in FIGS. 1 through 7, whereas the roller assembly 3-2 is constituted by nine rollers 3-2a, 3-2b . . . 3-2i (In FIG. 8 only rollers 3-2a and 3-2f are shown for simplicity.), each having a smooth surface without the provision of ridges or rings 12. The roller 3-1a is provided with a gear 48 adjacent the upright support frame 2. The gear 48 meshes with a second gear 49, which is connected to one end of a shaft 50 via a universal joint 51. A gear 52, which is in meshing relationship with a gear 53, is connected to the other end of the shaft 50 via a universal joint 54. The gear 53 is secured to a shaft 55 of the roller 3-2a rotatably supported between support discs 56 and 57. At the other end of the roller 3-2a, a shaft 58, to which a sprocket 59 is secured, is provided. The other rollers 3-2b . . . 3-2i each having a sprocket 60 are freely and rotatably supported between the support discs 56 and 57. Around the sprockets 59 and 60, an endless chain 61 is passed under tension.

With this arrangement, upon the rotation of the roller 3-1a, the shaft 50 is rotated via gears 48 and 49. The rotation of the shaft 50 is in turn transmitted via gears 52 and 53 to the roller 3-2a, which in turn rotates the remaining rollers 3-2b . . . 3-2i as the sprocket 59 being rotated transmits through the chain 61 the rotating movement to the sprockets 60. Thus, the rollers 3-2 are rotated at the same speed. The rollers 3-2 are offset relative to the central axis x similarly to the embodiment shown in FIGS. 1 through 7.

As shown in FIG. 8, the diameter $d_1$ of the mandrels or recessed portions of the roller assembly 3-1 is slightly larger than the diameter $d_2$ of the roller assembly 3-2 in consideration of the thickness of the inner wall. Since the diameter $d_2$ is slightly smaller than the diameter $d_1$, the meshing ratio of the gears 48 and 49 and/or the gears 52 and 53 is regulated so that the rollers 3-2 are rotated slightly faster than the rollers 3-1. Thus, the rotating circumferential speed at the bonding face of the outer wall is made the same as that at the bonding face of the inner wall. In this manner, there is no fear that the inner wall is entrained by the outer wall when manufacturing the corrugated tube to thereby cause distortions.

The rollers 3-2 may be freely rotatable between the support discs 56 and 57 without providing the gears 48, 49, 52 and 53, the shaft 50 and the sprockets 59 and 60. In this embodiment, the inner wall in a softened state is bonded to the outer wall and entrained and then guided by the free rotation of the rollers 3-2.

Referring back to FIG. 4a, each of the rollers has a rotary joint 41 connected to its inner end which joint is in turn connected with a water supply conduit 42. Cooling water may be introduced through the conduit 42 and rotary joint 41 into an inner conduit 43 disposed within the roller. The cooling water is then passed through an annular space defined between the wall of the inner conduit 43 and the inner wall of the roller back into the rotary joint 41 and discharged therethrough.

FIG. 4b illustrates another form of cooling system wherein the cooling water introduced into the hollow roller is discharged through a pipe 44 and hence through a discharge conduit 45 disposed within the base shaft 5. In this manner, the roller surface is cooled whereby the hot strips of synthetic resin may be fed at a high rate to increase the productivity.

Figure 9:
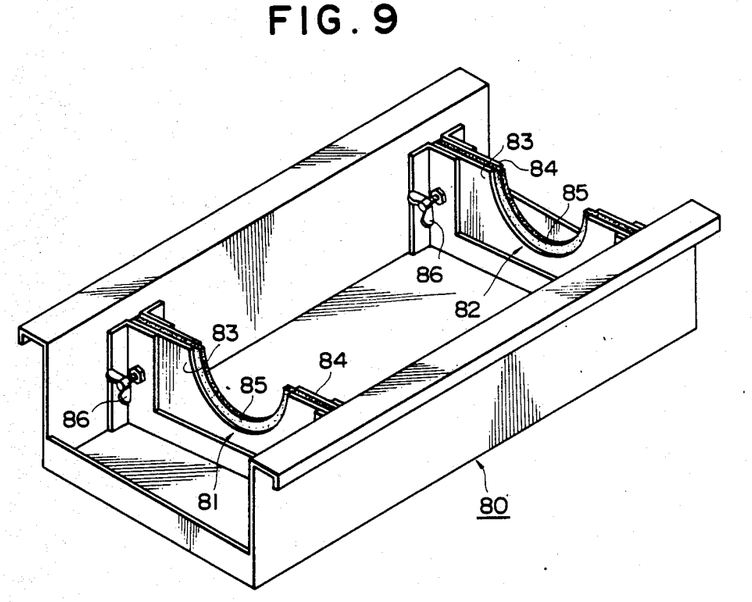
FIG. 9 is a perspective view showing the cooling and regulating means according to the invention.

Referring to FIG. 9, a trough 80 is generally shown. The trough has two partition plates 81, 82. In the enclosure defined by the trough 80 and the partition plates 81, 82, water is stored for cooling the corrugated tube produced according to the invention. Each partition plate is composed of two side plate members 83, 84 and a central plate member 85 sandwitched therebetween and movable up and down. The central plate member 85 should be made of materials having proper hardness so that when contacted with the spiral convolutions formed on the corrugated tube wall, the plate member 85 regulates and finishes the form of the spiral convolutions while preventing leakage of water in the trough 80. As shown in FIG. 4a, the partition plate 81 is adapted to the roller assembly 3, whereas the plate 82 is out of the assembly 3. At the start-up, the central plate member is placed at its lowermost position. When the strips are wrapped around the assembly 3 and the leading edge of the corregated tube arrives at the partition plate 82, the central plate member 85 is moved upwards to contact and properly fit the spiral convolutions on the tube and fastened by screws 86. Of course, the partition plate 81 should be placed at the position where predetermined tube wall thickness is made of the strips and where the tube wall has not yet solidified. When the trough is adapted, manufacturing speed is greatly enhanced. Further, good finished products are obtained.

From the foregoing descriptions it is to be appreciated that according to this invention, a corrugated tube having a smooth inner wall surface along the length of the tube and a corrugated outer wall in longitudinal cross-section is continuously manufactured. Of course, the corrugated tube formed according to the present invention provides a desired flexibility due to the corrugated wall configuration and may be advantageously used as a closed drainage pipe for agriculture or earth works, a conduit for electric conductors, and the like, without any fear for blockade.

Furthermore, according to the present invention, corrugated tubes having different shapes of corrugation may be produced inasmuch as the rings on the rollers constituting a roller assembly may be replaced by rings of different configurations and the distances between the rings may also be varied.

While the present invention has been described with reference to the preferred embodiments, it is to be understood that various changes and modifications may be made without departing from the spirit and scope of the invention.

What is claimed is:

1. A method of manufacturing a corrugated tube having a smooth inner wall surface along a length of the tube and axially extending spiral convolutions to define a corrugated outer wall in longitudinal cross-section comprising the steps of:

arranging in a circular array a plurality of rollers each rotating at the same speed such that an imaginary cylinder is defined about a central axis by said rollers, said rollers having longitudinal axes parallel to each other but offset with respect to the central axis of the imaginary cylinder;

continuously feeding a first strip of synthetic resin material in a softened state generally perpendicularly to a length of said rollers in such a manner that said strip is helically wrapped around and advanced axially along said imaginary cylinder defined by the rollers with portions of adjacent turns of the strip overlapping one another and welding together to form a continuous tube, each of said rollers having a first portion with axially spaced annular ridges around an outer periphery thereof and a second portion with a smooth surface, said ridges of a respective roller being so arranged that associated successive ridges of each adjacent roller are aligned in a spiral path around said imaginary cylinder, said first strip of synthetic resin material being fed onto the imaginary cylinder while being pressed onto at least one of said first portions of the rollers so that said convolutions are formed on the strip by the ridges, while one turn of the first strip being wrapped around said imaginary cylinder is overlapped by a next succeeding turn of the strip, thereby forming said corrugated outer wall; and continuously feeding a second strip of synthetic resin material from inside said imaginary cylinder, said second strip of synthetic resin material in a softened state being fed onto an inner surface of said outer wall and bonded thereto and guided by and spirally wrapped around said second portion of each roller so that the smooth inner wall is formed on the inner surface of said outer wall, while one turn of the second strip being wrapped around said second portions of the rollers is overlapped by a next succeeding turn of the second strip, thereby forming said smooth inner wall surface.

2. The method according to claim 1, wherein said first and second strips are cooled through said rollers by a cooling medium passing through said rollers and the strips having been formed into a corrugated tube having inner and outer walls are further passed through a cooling medium for exterior cooling of the strips.

3. The method according to claim 1, wherein said second portion of each of the rollers is rotated independently of said first portion of each of the rollers and wherein said second portion of each roller is rotated faster than the first portion of each roller such that a circumferential rotating speed of the axially advancing outer wall at the bonding inner surface to said second strip forming the inner wall is the same as a circumferential rotating speed of the spirally wrapping second strip.

4. The method according to claim 1, wherein the second portion of each of the rollers is freely rotated independently of said first portion of each of the rollers and wherein said second strip bonded to the inner surface of the outer wall is entrained by the axially advancing outer wall and guided by the free rotation of said second portion of the roller.

* * * * *